(12) United States Patent
Miyabe et al.

(10) Patent No.: US 11,396,460 B2
(45) Date of Patent: *Jul. 26, 2022

(54) SULFATE ION REMOVAL SYSTEM AND METHOD FOR REMOVING SULFATE ION

(71) Applicant: NITTO DENKO CORPORATION, Ibaraki (JP)

(72) Inventors: Tomotsugu Miyabe, Osaka (JP); Masashi Echizen, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/965,948

(22) PCT Filed: Nov. 11, 2019

(86) PCT No.: PCT/JP2019/044160
§ 371 (c)(1),
(2) Date: Jul. 29, 2020

(87) PCT Pub. No.: WO2020/183786
PCT Pub. Date: Sep. 17, 2020

(65) Prior Publication Data
US 2021/0214243 A1    Jul. 15, 2021

(30) Foreign Application Priority Data
Mar. 12, 2019  (JP) .............................. JP2019-045285

(51) Int. Cl.
*C02F 1/44*   (2006.01)
*B01D 69/10*  (2006.01)
*C02F 101/10* (2006.01)

(52) U.S. Cl.
CPC .............. *C02F 1/442* (2013.01); *B01D 69/10* (2013.01); *C02F 2101/101* (2013.01)

(58) Field of Classification Search
USPC ......................................................... 210/652
See application file for complete search history.

(56) References Cited

U.S. PATENT DOCUMENTS 4,242,208 A   12/1980  Kawaguchi et al.
5,051,178 A    9/1991  Uemura et al.
(Continued)

FOREIGN PATENT DOCUMENTS

CN    102949938    3/2013
CN    106621836    5/2017
(Continued)

OTHER PUBLICATIONS

Malaisamy, R. et al., "High-Flux Nanofiltration Membranes Prepared by Adsorption of Multilayer Polyelectrolyte Membranes on Polymeric Supports," Langmuir, vol. 21, No. 23, 2005, pp. 10587-10592.
(Continued)

*Primary Examiner* — Nina Bhat
(74) *Attorney, Agent, or Firm* — Hamre, Schumann, Mueller & Larson, P.C.

(57) ABSTRACT

A sulfate ion removal system 100 includes: a flow passage 50; and a nanofiltration membrane 62 that is provided in the flow passage 50, has a cationic coating 40 constituting a surface of the membrane, and removes a sulfate ion contained in water to be treated by filtering the water to be treated. Treated water obtained by filtering, with the nanofiltration membrane 62, the water to be treated is, for example, injection water to be injected into an oil field.

5 Claims, 2 Drawing Sheets

(56) References Cited

U.S. PATENT DOCUMENTS

| | | | |
|---|---|---|---|
| 5,178,766 A | 1/1993 | Ikeda et al. | |
| 5,733,602 A | 3/1998 | Hirose et al. | |
| 5,922,203 A | 7/1999 | Tomaschke | |
| 5,972,080 A * | 10/1999 | Nagata | C08G 73/10 96/13 |
| 6,413,425 B1 | 7/2002 | Hachisuka et al. | |
| 10,525,423 B2 * | 1/2020 | Wang | B01D 61/027 |
| 2004/0029143 A1 | 2/2004 | Van Ness et al. | |
| 2011/0284458 A1 | 11/2011 | Mickols et al. | |
| 2012/0048798 A1 | 3/2012 | Cheng et al. | |
| 2012/0255898 A1 | 10/2012 | Buschmann | |
| 2012/0261340 A1 * | 10/2012 | Williams | B01D 61/12 210/641 |
| 2014/0353242 A1 | 12/2014 | Kim et al. | |
| 2015/0053610 A1 * | 2/2015 | Diallo | B01D 67/0079 210/500.23 |
| 2016/0068415 A1 * | 3/2016 | Mok | B01D 9/0054 210/638 |
| 2016/0221851 A1 * | 8/2016 | Gonzalez | C02F 9/00 |
| 2016/0279581 A1 * | 9/2016 | Echizen | B01D 69/12 |
| 2016/0325239 A1 | 11/2016 | Adden et al. | |
| 2017/0144110 A1 * | 5/2017 | Shimura | B01D 71/66 |
| 2018/0280890 A1 * | 10/2018 | Nishiyama | B01D 63/103 |
| 2018/0318771 A1 * | 11/2018 | Koiwa | B32B 3/266 |
| 2018/0326362 A1 * | 11/2018 | Niu | B01D 69/12 |
| 2018/0369756 A1 * | 12/2018 | Strauss | B01D 69/02 |
| 2019/0217249 A1 * | 7/2019 | Amado-Torres | B01D 69/125 |
| 2020/0094194 A1 * | 3/2020 | Miyabe | B01D 71/56 |
| 2020/0188861 A1 * | 6/2020 | Hamada | B01D 71/82 |
| 2020/0353426 A1 * | 11/2020 | Kawashima | B01D 71/70 |

FOREIGN PATENT DOCUMENTS

| | | |
|---|---|---|
| CN | 107029558 | 8/2017 |
| CN | 108187512 | 6/2018 |
| EP | 0085111 | 8/1983 |
| EP | 3626331 | 3/2020 |
| EP | 3626332 | 3/2020 |
| JP | S54151570 | 11/1979 |
| JP | S5824303 | 2/1983 |
| JP | H01180208 | 7/1989 |
| JP | H05507654 | 11/1993 |
| JP | H08224452 | 9/1996 |
| JP | 2005262078 | 9/2005 |
| JP | 2006021110 | 1/2006 |
| JP | 2006272067 | 10/2006 |
| JP | 2011110469 | 6/2011 |
| JP | 2015066494 | 4/2015 |
| JP | 2015089532 | 5/2015 |
| JP | 2016190213 | 11/2016 |
| JP | 2017124382 | 7/2017 |
| JP | 6484748 | 3/2019 |
| KR | 101487575 | 1/2015 |
| WO | 9220438 | 11/1992 |
| WO | 2017022694 | 2/2017 |

OTHER PUBLICATIONS

International Search Report issued for International Patent Application No. PCT/JP2019/044160, dated Dec. 17, 2019, 5 pages including English translation.

Office Action issued for Japanese Patent Application No. 2018-176627, dated Oct. 30, 2018, 9 pages including English translation.

Fu Liu et al., "positively charged loose nanofiltration membrane grafted byUV for salt and dye removal", Reactive & Functional polymers (2015) 191-198. (Year: 2015).

Extended European Search Report issued for European Patent Application No. 19184791.2, dated Feb. 17, 2020, 10 pages.

Malaisamy, R. et al., "Polyelectrolyte modification of nanofiltration membrane for selective removal of monovalent anions," Separation and Purification Technology 77 (2011) 367-374.

Gryta, M. et al., "Evaluation of fouling potential of nanofiltration membranes based on the dynamic contact angle measurements," Pol. J. Chem. Tech., vol. 14, No. 3, 2012, 97-104.

First Examination Report issued for Indian Patent Application No. 201914014126, dated Jul. 24, 2020, 5 pages.

Extended European Search Report issued for European Patent Application No. 19919137.0, dated Jan. 7, 2022, 11 pages.

* cited by examiner

SULFATE ION REMOVAL SYSTEM AND METHOD FOR REMOVING SULFATE ION

TECHNICAL FIELD

The present invention relates to a system for removing a sulfate ion from water and a method for removing a sulfate ion.

BACKGROUND ART

A method for recovering crude oil by injecting water into an oil field and increasing pressure thereof is known as a water flooding method. Patent Literature 1 discloses a system for producing injection water out of seawater using a nanofiltration membrane.

Seawater contains a relatively high concentration of sulfate ions. When the sulfate ion concentration in the injection water is high, a metal in soil, such as barium and strontium, and the sulfate ions form a salt, and the salt is deposited in an oil reservoir, a pipe, a pump, etc. This significantly hinders the mining of the crude oil. Therefore, a system for producing the injection water is built so that the sulfate ion concentration in the injection water is lower than a predetermined threshold concentration.

In the present specification, a "nanofiltration membrane" may be referred to as an "NF membrane".

CITATION LIST

Patent Literature

Patent Literature 1: JP 2017-124382 A

SUMMARY OF INVENTION

Technical Problem

The above-mentioned system lowers the sulfate ion concentration to a concentration lower than 40 to 100 ppm (mg/L), for example. Depending on the characters of the oil reservoir, however, it is necessary to remove sulfate ions to achieve an even lower sulfate ion concentration. In light of this, a technique for removing sulfate ions to achieve such an even lower sulfate ion concentration is required.

Solution to Problem

The present invention provides a sulfate ion removal system including;

a flow passage; and a nanofiltration membrane that is provided in the flow passage, has a cationic coating constituting a surface of the membrane, and removes a sulfate ion contained in water to be treated by filtering the water to be treated.

In another aspect, the present invention provides a method for removing a sulfate ion, including;

filtering, with a nanofiltration membrane, water to be treated and thereby producing treated water, wherein the nanofiltration membrane has a cationic coating constituting a surface of the membrane, and removes a sulfate ion contained in the water to be treated by filtering the water to be treated.

Advantageous Effects of Invention

The present invention makes it possible to remove sulfate ions to achieve an even lower sulfate ion concentration.

DESCRIPTION OF EMBODIMENTS

Hereinafter, embodiments of the present invention will be described with reference to the drawings. The present invention is not limited to the following embodiments.

Figure 1:
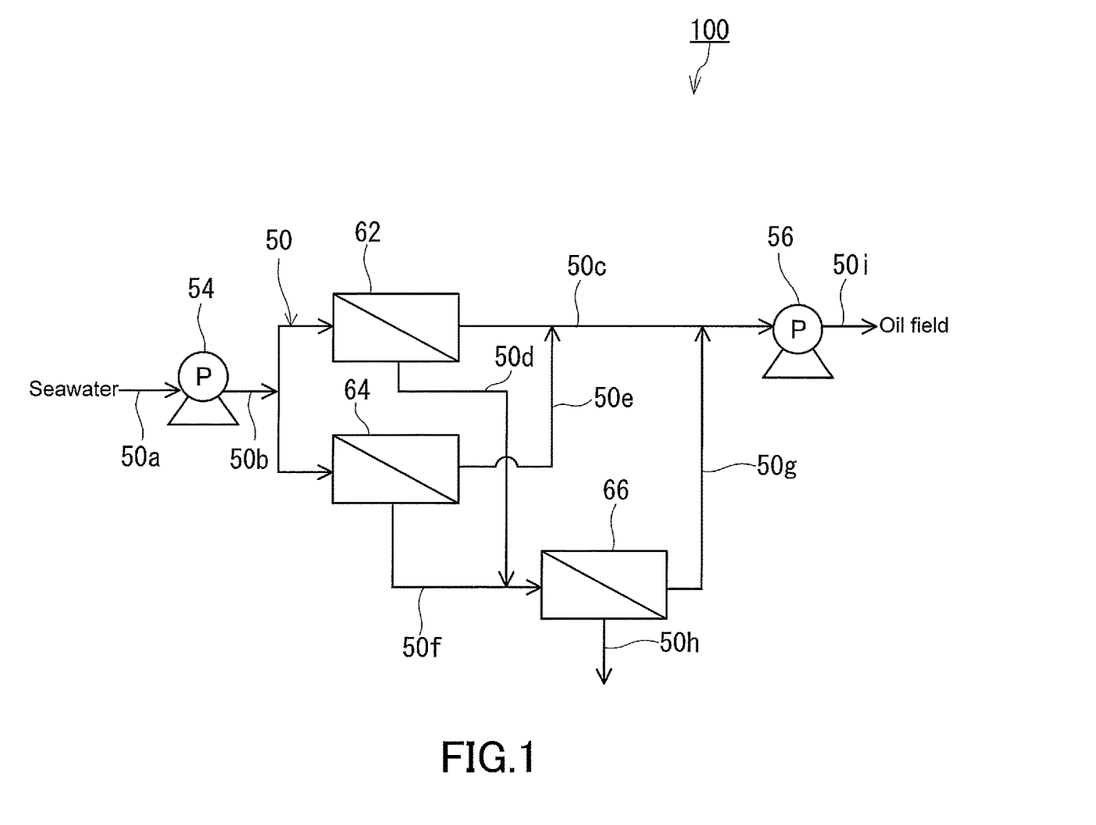
FIG. 1 is a configuration diagram of a sulfate ion removal system according to one embodiment of the present invention.

FIG. 1 shows a configuration of a sulfate ion removal system 100 (hereinafter referred to simply as a "removal system 100") according to one embodiment of the present invention. The removal system 100 is a system for producing injection water to be injected into an oil field, for example.

The removal system 100 includes a flow passage 50 and a plurality of NF membrane elements 62, 64 and 66. The flow passage 50 is a flow passage through which water to be treated and treated water flow. The NF membrane elements 62, 64 and 66 are provided in the flow passage 50. The NF membrane elements 62, 64 and 66 may include the NF membrane elements 62 and 64 disposed in parallel to each other. Also, the NF membrane elements 62, 64 and 66 may be disposed so that concentrated water from the NF membrane element 64 positioned upstream is further filtered with the NF membrane element 66 positioned downstream. Only the NF membrane element 62 may be provided in the flow passage 50.

In the present embodiment, water to be treated is seawater, and treated water obtained by filtering the seawater with the NF membrane elements 62, 64 and 66 is injection water to be injected into the oil field. The present embodiment makes it possible to supply an oil field with injection water having a sufficiently low sulfate ion concentration. This suppresses the deposition of a salt, making it possible to mine crude oil smoothly by a water flooding method over a long period of time.

The water to be treated for producing the injection water is not particularly limited. Examples of the water to be treated include seawater, river water, lake water, ground water and oilfield produced water. In the present embodiment, seawater is mentioned as an example of the water to be treated.

The NF membrane elements 62, 64 and 66 each are composed of an NF membrane having a cationic coating. The NF membrane having a cationic coating makes it possible to remove sulfate ions from seawater more sufficiently. The cationic coating is a coating constituting a surface of the NF membrane on the side of the water to be treated, and is a coating that allows the surface of the NF membrane to be positively charged.

The charged state of the surface of the NF membrane can be specified by, for example, measuring a zeta potential of the surface. For example, an electrophoresis measurement is carried out with a commercially-available electrophoretic light scattering apparatus using a pH 6.0 NaCl solution. The zeta potential is calculated using an electrical mobility measured and a Smoluchowski equation. A polarity of the surface can be specified by the zeta potential calculated. It is possible to check the zeta potential of a plate-like sample easily by using a cell unit for a plate included in a commercially-available zeta potential measurement system (such as ELSZ-2000Z available form Otsuka Electronics Co., Ltd.).

In the present specification, the "NF membrane" refers to a separation membrane that has an NaCl rejection ratio of 5% or more and less than 93% when filtering an aqueous NaCl solution having a concentration of 2000 mg/liter under the conditions at an operating pressure of 1.5 MPa and 25° C.

The removal system 100 further includes pumps 54 and 56. The pump 54 is disposed upstream of the NF membrane elements 62, 64 and 66 in the flow passage 50. The pump 54 gives seawater a pressure required to pass through the NF membrane constituting each of the NF membrane elements 62, 64 and 66. The pump 56 is disposed downstream of the NF membrane elements 62, 64 and 66 in the flow passage 50. The pump 56 gives a pressure to the injection water that is permeated water.

The flow passage 50 includes a plurality of flow passages 50*a* to 50*i*. An end of the flow passage 50 is connected to a water intake for seawater, and another end of the flow passage 50 is connected to an injection inlet of an oil field. The flow passage 50*a* connects the water intake for seawater to an inlet of the pump 54. The flow passage 50*b* connects an outlet of the pump 54 to an inlet of the NF membrane element 62, and also connects the outlet of the pump 54 to an inlet of the NF membrane element 64. The flow passage 50*c* connects a permeated water outlet of the NF membrane element 62 to an inlet of the pump 56. The flow passage 50*d* connects a concentrated water outlet of the NF membrane element 62 to the flow passage 50*f*. The flow passage 50*e* connects a permeated water outlet of the NF membrane element 64 to the flow passage 50*c*. The flow passage 50*f* connects a concentrated water outlet of the NF membrane element 64 to an inlet of the NF membrane element 66. The flow passage 50*g* connects a permeated water outlet of the NF membrane element 66 to the flow passage 50*c*. The flow passage 50*h* connects a concentrated water outlet of the NF membrane element 66 to the sea. The flow passage 50*i* connects an outlet of the pump 56 to the injection inlet of the oil field. Each of the flow passages is composed of at least one pipe.

When the pumps 54 and 56 are started, seawater is supplied to the NF membrane elements 62 and 64 through the flow passages 50*a* and 50*b*. The seawater is filtered with the NF membrane elements 62 and 64 to produce permeated water and concentrated water. The concentrated water produced with each of the NF membrane elements 62 and 64 is supplied, through the flow passages 50*d* and 50*f*, to the NF membrane element 66 and filtered therewith. The permeated water from each of the NF membrane elements 62, 64 and 66 is injected, as the injection water, into the oil field through the flow passages 50*c*, 50*e*, 50*g* and 50*i*. The concentrated water from the NF membrane element 66 may be discharged to the sea, or may be filtered with a reverse osmotic membrane and reused.

The sulfate ion concentration in the injection water is not particularly limited and it is 20 mg/liter or less, for example.

The seawater may undergo a predetermined pretreatment before being supplied to the NF membrane elements 62 and 64. Examples of the predetermined pretreatment include a treatment in which the seawater is filtered using sand such as silica sand, a treatment in which the seawater is filtered with an UF membrane (an ultrafiltration membrane) or an MF membrane (a microfiltration membrane), and a treatment in which a bactericide is added in the seawater.

In the present embodiment, the NF membrane elements 62, 64 and 66 include the NF membrane elements 62 and 64 disposed parallel to each other. The NF membrane elements 62, 64 and 66 also include the NF membrane element 62 (or 64) positioned upstream and the NF membrane element 66 positioned downstream. The concentrated water from the NF membrane element 62 (or 64) positioned upstream is further filtered with the NF membrane element 66 positioned downstream. As can be understood from the arrangement shown in FIG. 1, the injection water is the treated water produced by passing through one of the NF membrane elements only one time. The number of the NF membrane elements through which the injection water has passed is substantially one.

Certainly, the permeated water from the NF membrane element positioned upstream can also be further treated with the NF membrane element positioned downstream. That is, it is possible to sufficiently lower the sulfate ion concentration in the injection water by carrying out a multi-step processing. However, it is impossible to carry out such a multi-step processing by using an existing single-step system (e.g., Patent Literature 1), and therefore the system needs to be rebuilt. This causes an increase in cost such as initial cost and running cost.

In contrast, according to the present embodiment, it is possible to sufficiently lower the sulfate ion concentration with the NF membrane having the cationic coating, and thus the water obtained by allowing seawater to pass through the NF membrane only one time can be used as the injection water. This makes it possible to build the removal system 100 of the present embodiment only by simple improvement of an existing single-step system, specifically, only by replacement of an NF membrane element. The present embodiment makes it possible to reduce the cost more significantly than the introduction of a new multi-step processing system.

Of course, sulfate ions may be removed by allowing the seawater to pass through the NF membrane having the cationic coating a plurality of times.

There is a correlation between the temperature of the seawater and the sulfate ion concentration in the injection water. A high temperature of the seawater increases the sulfate ion concentration in the injection water. The removal system 100 of the present embodiment makes it possible to sufficiently lower the sulfate ion concentration even when the temperature of the seawater is relatively high. Moreover, the NF membrane elements 62, 64 and 66 each have high initial performance, and therefore it is possible to reduce the sulfate ion concentration to a low concentration over a long period of time.

Next, the NF membrane used for each of the NF membrane elements 62, 64 and 66 will be described in detail.

Each of the NF membrane elements 62, 64 and 66 is a spiral-type membrane element, for example. The spiral-type membrane element is produced using, for example, a raw water spacer, a permeated water spacer, and an NF membrane 60 shown in FIG. 2.

Figure 2:
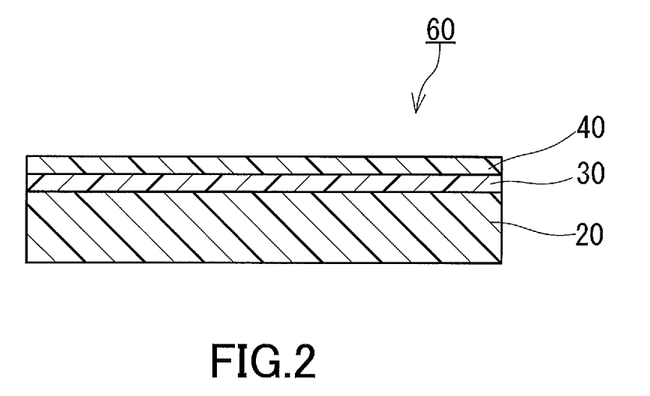
FIG. 2 is a cross-sectional view of a nanofiltration membrane.

As shown in FIG. 2, the NF membrane 60 includes a porous support membrane 20, a separation functional layer 30 and a coating 40. The coating 40 is a cationic coating that covers the separation functional layer 30 and constitutes a surface of the NF membrane. Seawater as the water to be treated is in contact with a surface of the coating 40.

In the NF membrane 60, the porous support membrane 20, the separation functional layer 30 and the coating 40 are stacked in this order. The separation functional layer 30 and the coating 40 are supported by the porous support membrane 20. The separation functional layer 30 is disposed on the porous support membrane 20. The coating 40 is disposed on the separation functional layer 30. The coating 40 is in contact with the separation functional layer 30. The NF membrane 60 can be a composite semipermeable membrane.

The separation functional layer 30 is composed of, for example, a polyamide containing, as a monomer unit, at least one selected from the group consisting of piperazine and a piperazine derivative. Such a polyamide rejects a divalent ion such as a sulfate ion, while allowing a monovalent ion, such as $Na^+$ and $Cl^-$, to pass therethrough. That is, the polyamide can remove selectively the divalent ion such as a sulfate ion. The coating 40 further improves the sulfate ion removal performance of the NF membrane 60.

The NF membrane 60 can be produced by the following method.

First, the porous support membrane 20 is prepared as a support. The porous support membrane 20 is not particularly limited as long as it is a membrane on a surface of which the separation functional layer can be formed. The porous support membrane 20 used may be an ultrafiltration membrane having a non-woven fabric on which a microporous layer with an average pore diameter of 0.01 to 0.4 μm is formed. Examples of a material forming the microporous layer include polyarylethersulfones, polyimide, and polyvinylidene fluoride. From the viewpoint of chemical stability, mechanical stability and thermal stability, polyarylethersulfones such as polysulfone and polyethersulfone can be used. A self-supporting porous support membrane having an average pore diameter as specified above and made of a thermosetting resin such as epoxy resin can also be used. The thickness of the porous support membrane 20 is not particularly limited. The thickness is, for example, in the range of 10 to 200 μm and may be in the range of 20 to 75 μm.

In the present specification, the "average pore diameter" refers to a value calculated by the following method. First, a surface or cross-section of the membrane or layer is observed with an electron microscope (e.g., a scanning electron microscope), and the diameters of a plurality of observed pores (e.g., 10 randomly selected pores) are actually measured. The average of the actually measured diameters of the pores is defined as the "average pore diameter". The "diameter of a pore" refers to the longest diameter of the pore, and specifically refers to the diameter of the smallest of the circles that can enclose the pore.

Next, a first solution containing a material of the separation functional layer 30 is brought into contact with the porous support membrane 20. The first solution is typically an aqueous solution containing a polyfunctional amine as the material of the separation functional layer 30 (this solution will hereinafter be referred to as an "aqueous amine solution"). The contact of the aqueous amine solution with the porous support membrane 20 results in the formation of an amine-containing layer on a surface of the porous support membrane 20. The aqueous amine solution may contain, in addition to water, a polar solvent other than water, such as an alcohol. A polar solvent other than water, such as an alcohol, may be used instead of water.

The polyfunctional amine may be at least one selected from the group consisting of piperazine and a piperazine derivative. The piperazine derivative is a compound obtained by substitution of at least one hydrogen atom bonded to a carbon atom or nitrogen atom of piperazine with a substituent. Examples of the substituent include an alkyl group, an amino group and a hydroxy group. Examples of the piperazine derivative include 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, 2,5-di-n-butylpiperazine, and 4-aminomethylpiperazine.

One compound selected from piperazine and the above piperazine derivatives may be used alone as the polyfunctional amine, or a combination of two or more selected from piperazine and the above piperazine derivatives may be used as the polyfunctional amine.

The piperazine derivatives include a substance other than the above. It is important to form the separation functional layer 30 having fewer unreacted components as well as fewer defects such as pinholes in order to obtain the NF membrane 60 having sufficient sulfate ion removal performance. Taking this into consideration, it is recommended to use suitably the substituent in the piperazine derivatives.

In order to facilitate the formation of the amine-containing layer and improve the performance of the separation functional layer 30, a polymer such as polyvinyl alcohol, polyvinylpyrrolidone and polyacrylic acid, or a polyhydric alcohol such as sorbitol and glycerin may be added to the aqueous amine solution.

The concentration of the amine component in the aqueous amine solution may be in the range of 0.1 to 15 wt % and may be in the range of 1 to 10 wt %. When the concentration of the amine component is properly adjusted, the occurrence of defects, such as pinholes, in the separation functional layer 30 can be reduced. Additionally, the separation functional layer 30 having high salt rejection performance can be formed. Further, the proper adjustment of the concentration of the amine component leads to proper adjustment of the thickness of the separation functional layer 30, thus resulting in the NF membrane 60 capable of achieving a sufficient permeation flux.

The method for bringing the aqueous amine solution into contact with the porous support membrane 20 is not particularly limited. A method in which the porous support membrane 20 is immersed in the aqueous amine solution, a method in which the aqueous amine solution is applied to the porous support membrane 20, and a method in which the porous support membrane 20 is sprayed with the aqueous amine solution can be used as appropriate. The step of bringing the aqueous amine solution into contact with the porous support membrane 20 may be followed by the step of removing the excess of the aqueous amine solution from the porous support membrane 20. For example, the excess of the aqueous amine solution can be removed from the porous support membrane 20 by extending the amine-containing layer with a rubber roller. The removal of the excess of the aqueous amine solution can result in the formation of the separation functional layer 30 with an appropriate thickness.

Next, a second solution is brought into contact with the amine-containing layer. The second solution is a solution containing another material of the separation functional layer 30. Specifically, the second solution is a solution containing a polyfunctional acid halide as the other material of the separation functional layer 30 (this solution will hereinafter be referred to as an "acid halide solution"). The contact of the acid halide solution with the amine-containing layer allows a polymerization reaction of the amine and the acid halide to proceed at the interface between the amine-containing layer and a layer of the acid halide solution. Thus, the separation functional layer 30 is formed.

The polyfunctional acid halide is an acid halide having a plurality of reactive carbonyl groups. Examples of the polyfunctional acid halide include an aromatic polyfunctional acid halide, an aliphatic polyfunctional acid halide, and an alicyclic polyfunctional acid halide.

Examples of the aromatic polyfunctional acid halide include trimesic acid trichloride, terephthalic acid dichloride, isophthalic acid dichloride, biphenyldicarboxylic acid dichloride, naphthalenedicarboxylic acid dichloride, benzenetrisulfonic acid trichloride, benzenedisulfonic acid dichloride, and chlorosulfonyl benzenedicarboxylic acid dichloride.

Examples of the aliphatic polyfunctional acid halide include propanedicarboxylic acid dichloride, butanedicarboxylic acid dichloride, pentanedicarboxylic acid dichloride, propanetricarboxylic acid trichloride, butanetricarboxylic acid trichloride, pentanetricarboxylic acid trichloride, glutaryl halide, and adipoyl halide.

Examples of the alicyclic polyfunctional acid halide include cyclopropanetricarboxylic acid trichloride, cyclobutanetetracarboxylic acid tetrachloride, cyclopentanetricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, and tetrahydrofurandicarboxylic acid dichloride.

One polyfunctional acid halide selected from these polyfunctional acid halides may be used alone, or two or more selected from these polyfunctional acid halides may be used in combination. An aromatic polyfunctional acid halide may be used in order to obtain the separation functional layer 30 having high sulfate ion removal performance. A polyfunctional acid halide having three or more valences may be used as at least part of the polyfunctional acid halide component to form a cross-linked structure.

As the solvent of the acid halide solution there can be used an organic solvent, in particular a non-polar organic solvent. The organic solvent is not particularly limited as long as the organic solvent has low solubility in water and can dissolve the polyfunctional acid halide component without deteriorating the porous support membrane 20. Examples of the organic solvent include saturated hydrocarbons such as cyclohexane, heptane, octane and nonane, and a halogen-substituted hydrocarbon such as 1,1,2-trichlorotrifluoroethane. A saturated hydrocarbon having a boiling point of 300° C. or lower or 200° C. or lower may also be used.

The concentration of the acid halide component in the acid halide solution may be in the range of 0.01 to 5 wt % and may be in the range of 0.05 to 3 wt %. When the concentration of the acid halide component is properly adjusted, the amounts of the amine and halide components remaining unreacted can be reduced. Additionally, the occurrence of defects, such as pinholes, in the separation functional layer 30 can be reduced, and thus the NF membrane 60 having high sulfate ion removal performance can be provided. Further, the proper adjustment of the concentration of the acid halide component leads to proper adjustment of the thickness of the separation functional layer 30, thus providing the NF membrane 60 capable of achieving a sufficient permeation flux.

The method for bringing the acid halide solution into contact with the amine-containing layer is not particularly limited. The amine-containing layer may be immersed in the acid halide solution together with the porous support membrane 20, or the acid halide solution may be applied to a surface of the amine-containing layer. The time of contact between the amine-containing layer and the acid halide solution is, for example, 10 seconds to 5 minutes or 30 seconds to 1 minute. The contact between the amine-containing layer and the acid halide solution may be followed by the step of removing the excess of the acid halide solution from the amine-containing layer.

Next, the separation functional layer 30 is heated and dried together with the porous support membrane 20. The heat treatment of the separation functional layer 30 can improve the properties such as the mechanical strength and the heat resistance of the separation functional layer 30. The heating temperature is, for example, 70 to 200° C. or 80 to 130° C. The heating time is, for example, 30 seconds to 10 minutes or 40 seconds to 7 minutes. A drying step may be carried out at a room temperature, and subsequently another drying step may be carried out using a dryer at an ambient temperature higher than the room temperature.

The conditions under which interfacial polymerization is carried out are described, for example, in JP 58-24303 A and JP 1-180208 A. Such known techniques can be employed in the method of the present embodiment.

Various additives can be added to the aqueous amine solution and/or the acid halide solution in order to facilitate the formation of the separation functional layer 30 or improve the performance of the NF membrane 60 to be obtained. Examples of the additives include: a surfactant such as sodium dodecylbenzenesulfonate, sodium dodecyl sulfate, and sodium lauryl sulfate; a basic compound, such as sodium hydroxide, trisodium phosphate and triethylamine, which has an effect on removal of halogenated hydrogen produced as a result of polymerization; an acylation catalyst; and a compound as described in JP 8-224452 A which has a solubility parameter of 8 to 14 $(cal/cm^3)^{1/2}$.

By carrying out the above steps, a membrane having the porous support membrane 20 and the separation functional layer 30 is obtained. The thickness of the separation functional layer 30 is not particularly limited. The thickness is, for example, 0.05 to 2 μm and may be 0.1 to 1 μm.

The present specification describes a method in which the separation functional layer 30 is formed directly on a surface of the porous support membrane 20 by interfacial polymerization. It should be noted that the separation functional layer 30 may be formed on a support other than the porous support membrane 20, and the separation functional layer 30 obtained may be placed on and joined to the porous support membrane 20. In other words, the separation functional layer 30 may be transferred onto the porous support membrane 20 from the other support.

Next, a solution containing a material of the coating 40 is brought into contact with the separation functional layer 30. The material of the coating 40 can be a polymer having a repeating unit represented by the following formula (1).

[Chemical Formula 1]

In the formula (1), $N^+$ is a nitrogen atom constituting a quaternary ammonium cation. $R^1$ and $R^2$ are each independently a substituent containing a carbon atom bonded to the nitrogen atom.

When the coating 40 contains the polymer having the repeating unit represented by the formula (1), the sulfate ion removal performance of the NF membrane 60 is improved.

In the formula (1), the counterion for $N^+$ is not particularly limited. The counterion for $N^+$ is a monovalent anion. Examples of the monovalent anion include halogen ions such as $F^-$, $Cl^-$, $Br^-$ and $I^-$.

In the formula (1), $R^1$ and $R^2$ may each be an alkyl group. Examples of the alkyl group include a methyl group, an ethyl group, and a propyl group. In particular, $R^1$ and $R^2$ may each be a methyl group. When $R^1$ and $R^2$ are each an alkyl group such as a methyl group, the coating 40 can sufficiently improve the sulfate ion removal performance of the NF membrane 60. When $R^1$ and $R^2$ are each an alkyl group such as a methyl group, the coating 40 causes less influence on the salt rejection ratio of the NF membrane 60.

In the formula (1), $R^1$ may be a methyl group, while $R^2$ may be a 3-chloro-2-hydroxypropyl group. In this case, the repeating unit of the polymer is represented by the following formula (2).

[Chemical Formula 2]

(2)

In the formula (1), $R^1$ may be a methyl group, while $R^2$ may be a 2,3-epoxypropyl group. In this case, the repeating unit of the polymer is represented by the following formula (3).

[Chemical Formula 3]

(3)

When an alkali is allowed to act on the repeating unit represented by the formula (2), the 3-chloro-2-hydroxypropyl group undergoes a cyclization reaction. This reaction converts the repeating unit represented by the formula (2) to the repeating unit represented by the formula (3).

The polymer contained in the coating 40 can be a copolymer of a first monomer and a second monomer. The first monomer can be a monomer containing a quaternary ammonium cation and serving to form the repeating unit represented by the formula (1). The first monomer can be 3-chloro-2-hydroxypropylmethyl diallyl ammonium chloride. When the second monomer is diallylmethylamine hydrochloride, the copolymer is represented by the following formula (4).

[Chemical Formula 4]

(4)

In the formula (4), m and n are each independently an integer of 1 or more. Part or all of the 3-chloro-2-hydroxypropyl groups contained in the polymer of the formula (4) may be a 2,3-epoxypropyl group as shown in the formula (3).

In the copolymer represented by the formula (4), the 3-chloro-2-hydroxypropyl group and/or the 2,3-epoxypropyl group contained in the first monomer can be a reactive substituent capable of being chemically bonded to the separation functional layer 30.

The polymer of the formula (4) can be obtained also by modification of a homopolymer. Specifically, a homopolymer of methyldiallylamine hydrochloride can be modified with epichlorohydrin to obtain the polymer of the formula (4).

The reactive substituent enhances the bond strength between the separation functional layer 30 and the coating 40. Specifically, at least part of the reactive substituents forms a covalent bond with a terminal amino group, a remaining amino group, or a remaining carbonyl group of the separation functional layer 30. Thus, the coating 40 is secured to the separation functional layer 30, so that the NF membrane 60 resistant to deterioration of sulfate ion removal performance even in long-term use can be provided. The terminal amino group and the remaining amino group of the separation functional layer 30 are derived from the polyfunctional amine. The remaining carbonyl group of the separation functional layer 30 is derived from the polyfunctional acid halide. The reactive substituent may be used in intramolecular cross-linking and/or intermolecular cross-linking of the polymer. Such cross-linking can improve the properties such as the mechanical strength and the heat resistance of the coating 40.

The reactive substituent may be contained in the second monomer. When the first monomer has a quaternary ammonium cation structure, fewer restrictions are imposed on the second monomer. That is, there is a lot of flexibility in choosing the second monomer.

The reactive substituent is not limited to a 3-chloro-2-hydroxypropyl group. Examples of the reactive substituent include an epoxy group, a hydroxy group, an amino group, and an amide group. One substituent selected from these reactive substituents may be contained alone in the polymer, or two or more selected from these reactive substituents may be contained in the polymer.

When the reactive substituent is contained in the second monomer, the second monomer is, for example, allylamine. The polymer is represented by the following formula (5).

[Chemical Formula 5]

(5)

In the formula (5), m and n are each independently an integer of 1 or more.

When the reactive substituent is contained in the second monomer, the second monomer is, for example, acrylamide. The polymer is represented by the following formula (6).

[Chemical Formula 6]

(6)

In the formula (6), m and n are each independently an integer of 1 or more.

When the reactive substituent is contained in the second monomer, the second monomer is, for example, 3-chloro-2-hydroxypropyl diallyamine hydrochloride. The polymer is represented by the following formula (7).

[Chemical Formula 7]

(7)

In the formula (7), m and n are each independently an integer of 1 or more.

One monomer selected from 3-chloro-2-hydroxypropyl diallylamine hydrochloride, allylamine and acrylamide may be used alone as the second monomer, or two or more selected from these monomers may be used as the second monomer.

The copolymer may be a random copolymer or a block copolymer.

The ratio between the first monomer and the second monomer is not particularly limited. For example, the ratio (first monomer:second monomer) is 5:95 to 95:5 and may be 30:70 to 70:30. When the ratio is within this range, the NF membrane 60 having superior sulfate ion removal performance and usable over a long period of time can be provided. The weight-average molecular weight of the polymer or copolymer is not particularly limited and is, for example, 10,000 to 100,000.

The coating 40 can be formed by bringing an aqueous solution containing the polymer into the separation functional layer 30 to form a polymer-containing layer and then drying the polymer-containing layer. The method for bringing the aqueous solution into contact with the separation functional layer 30 is not particularly limited. The separation functional layer 30 may be immersed in the aqueous solution together with the porous support membrane 20, or the aqueous solution may be applied to a surface of the separation functional layer 30. The time of contact between the separation functional layer 30 and the aqueous solution is, for example, 10 seconds to 5 minutes. The contact between the separation functional layer 30 and the aqueous solution may be followed by the step of removing the excess of the aqueous solution from the separation functional layer 30. The aqueous solution may contain, in addition to water, a polar solvent other than water, such as an alcohol. A polar solvent other than water, such as an alcohol, may be used instead of water.

Next, the polymer-containing layer is heated and dried. The heat treatment of the polymer-containing layer can improve the properties such as the mechanical strength and the heat resistance of the coating 40. The heating temperature is, for example, 80 to 150° C. The heating time is, for example, 30 to 300 seconds. A drying step may be carried out at a room temperature, and subsequently another drying step may be carried out using a dryer at an ambient temperature higher than the room temperature.

By carrying out the above steps, the NF membrane 60 having the porous support membrane 20, the separation functional layer 30 and the coating 40 is obtained. The thickness of the coating 40 is not particularly limited and is, for example, 10 to 900 nm. The presence of the coating 40 can be confirmed by means of a transmission electron microscope. The composition analysis of the polymer contained in the coating 40 can be carried out by Fourier-transform infrared spectroscopy (FT-IR), X-ray photoelectron spectroscopy (XPS), or time-of-flight secondary ion mass spectrometry (TOF-SIMS).

EXAMPLES (Sample 1)

An aqueous amine solution containing 7 wt % of piperazine, 0.15 wt % of sodium dodecyl sulfate, 1.48 wt % of sodium hydroxide, and 6 wt % of camphorsulfonic acid was applied to a porous polysulfone support. After that, the excess of the aqueous amine solution was removed from the support to form an amine-containing layer on the support. Next, the surface of the amine-containing layer was immersed for 10 seconds in an acid halide solution obtained by solving 0.42 wt % of trimesic acid trichloride in an isoparaffinic solvent (IP Solvent 1016 available from Idemitsu Kosan Co., Ltd.). After that, the excess of the acid halide solution was removed from the amine-containing layer, and the amine-containing layer was air-dried for 60 seconds and then placed in a hot air dryer at 120° C. for 3 minutes to form a separation functional layer on the porous polysulfone support. Next, the surface of the separation functional layer was immersed for 10 seconds in an aqueous solution containing 0.1 wt % of a polymer (UNISENCE KCA 101L available from SENKA Corporation). After that, the separation functional layer was air-dried for 30 seconds and then placed in a hot air dryer at 120° C. for 2 minutes to form a coating on the separation functional layer. An NF membrane of sample 1 was thus obtained. UNISENCE KCA 101L is a polymer represented by the formula (4).

Using the NF membrane of sample 1, a sample 1 spiral-type membrane element with a diameter of 201 mm and a length of 2016 mm was fabricated.

(Sample 2)

As a sample 2 spiral-type membrane element (with a diameter of 8 inches), a commercially-available NF membrane element having no cationic coating was prepared.

(Measurement of Sulfate Ion Removal Ratio)

The sample 1 and sample 2 spiral-type membrane elements each, only one of them at a time, were put into a pressure vessel, and simulant seawater was filtered with each of the spiral-type membrane elements under the following operating conditions, and then the sulfate ion concentration in the permeated water was measured by an ion chromatography method. Table 1 shows the results. The method for measuring the sulfate ion concentration is not particularly limited, and it may be measured by another method such as a titrimetric method and a gravimetric method.

<Operational Conditions>

Recovery ratio: 15%
Amount of permeated water: 0.4075 $m^3/m^2 \cdot day$
Temperature: 25° C.
pH: 6.5 to 7.0

The concentration of the ions contained in the simulant seawater was as follows. The unit of the concentration is mg/liter.

$Ca^{2+}$: 405
$Mg^{2+}$: 1280
$Na^+$: 10600
$K^+$: 430
$Cl^-$: 19400
$SO_4^{2-}$: 2460

[Table 1]

|  | Sulfate ion concentration in permeated water (mg/L) | Sulfate ion rejection ratio (%) | Sulfate ion concentration expected in actual system (mg/L) |
|---|---|---|---|
| Sample 1 | 2.2 | 99.92 | 7.3 to 14.5 |
| Sample 2 | 5.8 | 99.78 | 20 to 40 |

As shown in Table 1, the sample 1 including the NF membrane having the cationic coating had a sulfate ion rejection ratio higher than the sulfate ion rejection ratio of the sample 2. In addition, the sample 1 NF membrane element was also able to lower the sulfate ion concentration in the permeated water more significantly than the sample 2 NF membrane element. The sulfate ion concentration in the permeated water produced with the sample 1 NF membrane element was 2.2 mg/L. The sulfate ion concentration in the permeated water produced with the sample 2 NF membrane element was 5.8 mg/L. It is estimated that use of the sample 1 NF membrane element in an actual system will allow the sulfate ion concentration in the permeated water to fall in the range of 7.3 to 14.5 mg/L. It is estimated that use of the sample 2 NF membrane element in an actual system will allow the sulfate ion concentration in the permeated water to fall in the range of 20 to 40 mg/L.

Particularly, a quaternary ammonium cation is recommended because it can give a positive charge to a surface of the NF membrane without depending on the pH of a liquid to be treated. Furthermore, the polymer which is the material of the coating used in the sample 1 has a ring structure (a pyrrolidine ring) including a quaternary ammonium cation. The ring structure (the pyrrolidine ring) including a quaternary ammonium cation possibly contribute significantly to the improvement of the sulfate ion removal performance.

Therefore, it is reliably predicted that the desired effects of the present invention can be obtained even in the case where the cationic coating is formed using the polymer represented by each of the formulas (1) to (7) instead of, or together with the polymer represented by the formula (4).

INDUSTRIAL APPLICABILITY

The present invention can be used in applications such as production of oil field injection water, production of ultrapure water, desalination of seawater, and treatment of waste water.

The invention claimed is:

1. A sulfate ion removal system comprising:
   a flow passage configured for introducing sulfate ion-containing water to be treated; and
   a nanofiltration membrane for removing sulfate ions from the water to be treated, disposed within the flow passage, wherein a cationic coating constitutes a surface of the membrane.

2. The sulfate ion removal system according to claim 1, wherein
   the nanofiltration membrane further comprises a separation functional layer,
   the separation functional layer is composed of a polyamide prepared from a monomer that is at least one selected from the group consisting of piperazine and a piperazine derivative, and
   the cationic coating is disposed on or over the surface of the separation functional layer and contains a polymer having a repeating unit represented by the following formula (1):

wherein N+ is a nitrogen atom constituting a quaternary ammonium cation, and
   $R^1$ and $R^2$ are each independently a substituent containing a carbon atom bonded to the nitrogen atom.

3. The sulfate ion removal system according to claim 1, wherein
   the flow passage is connected to an oil field system such that treated water obtained downstream of the nanofiltration membrane is injected into an oil field.

4. A method for removing a sulfate ion, comprising:
   introducing sulfate ion-containing water to be treated into a flow passage, and
   passing the water to be treated through a nanofiltration membrane that is disposed within the flow passage, that has a cationic coating constituting a surface of the membrane, and that removes a sulfate ion contained in the water to be treated.

5. The sulfate ion removal system according to claim 2, wherein
   the flow passage is connected to an oil field system such that treated water obtained downstream of the nanofiltration membrane is injected into an oil field.

* * * * *